US012675576B2

(12) United States Patent　　　　(10) Patent No.: US 12,675,576 B2
Yu et al.　　　　　　　　　　　　　(45) Date of Patent: Jul. 7, 2026

(54) SECURE BOOT AND OPERATING SYSTEM MANAGEMENT

(71) Applicant: Dell Products L.P., Round Rock, TX (US)

(72) Inventors: Xinghai Yu, Beijing (CN); Colin Zou, San Jose, CA (US); Jin Wan, Beijing (CN)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 18/644,725

(22) Filed: Apr. 24, 2024

(65) Prior Publication Data

US 2025/0335594 A1　　Oct. 30, 2025

(51) Int. Cl.
| *G06F 15/177* | (2006.01) |
| *G06F 9/00* | (2018.01) |
| *G06F 21/12* | (2013.01) |
| *G06F 21/33* | (2013.01) |
| *G06F 21/57* | (2013.01) |

(52) U.S. Cl.
CPC ............ G06F 21/575 (2013.01); G06F 21/12 (2013.01); G06F 21/33 (2013.01)

(58) Field of Classification Search
CPC ......... G06F 21/575; G06F 21/12; G06F 21/33
See application file for complete search history.

(56) References Cited

U.S. PATENT DOCUMENTS

| 12,223,052 B1 * | 2/2025 | Wasserstrom | ........ G06F 21/602 |
| 12,434,034 B2 * | 10/2025 | Dixon | .................. G01F 23/706 |
| 2004/0064457 A1 * | 4/2004 | Zimmer | ................ G06F 21/575 |
| 2010/0185845 A1 * | 7/2010 | Takayama | ............. G06F 21/575 |
| | | | 713/189 |
| 2012/0079279 A1 * | 3/2012 | Leclercq | ............... H04L 9/3263 |
| | | | 380/282 |
| 2018/0276387 A1 * | 9/2018 | Liu | ........................ G06F 21/575 |

(Continued)

OTHER PUBLICATIONS

Wilkins, R., et al., UEFI Secure Boot in Modern Computer Security Solutions, available at: https://uefi.org/sites/default/files/resources/ UEFI_Secure_Boot_in_Modern_Computer_Security_Solutions_ 2013.pdf (last accessed Apr. 24, 2024), Sep. 26, 2013.

*Primary Examiner* — Xuxing Chen

(74) *Attorney, Agent, or Firm* — Ryan, Mason & Lewis, LLP

(57)　　　　　　ABSTRACT

Methods, apparatus, and processor-readable storage media for secure boot and operating system management are provided herein. An example method includes configuring a first set of settings associated with a boot process for validating software components, where at least one of the software components is executed in a user space of an operating system. The method includes verifying, in response to obtaining a request to initiate the boot process, a second set of settings that is currently assigned to the boot process based on a comparison of the first set of settings and the second set of settings, and performing the boot process based on a result of the verifying, wherein the boot process comprises validating the software components based at least in part on the verified second set of settings and respective signatures computed for the software components, and initiating an automated action based on a result of the validating.

20 Claims, 6 Drawing Sheets

(56) References Cited

U.S. PATENT DOCUMENTS

| | | | |
|---|---|---|---|
| 2023/0244790 A1* | 8/2023 | Langenbach | G06F 21/51 |
| | | | 713/2 |
| 2024/0089097 A1* | 3/2024 | Sugahara | H04L 9/14 |
| 2024/0202340 A1* | 6/2024 | Rao | G06F 21/575 |
| 2024/0250821 A1* | 7/2024 | Yang | G06F 9/45558 |
| 2025/0233759 A1* | 7/2025 | Pyle | H04L 9/0825 |

* cited by examiner

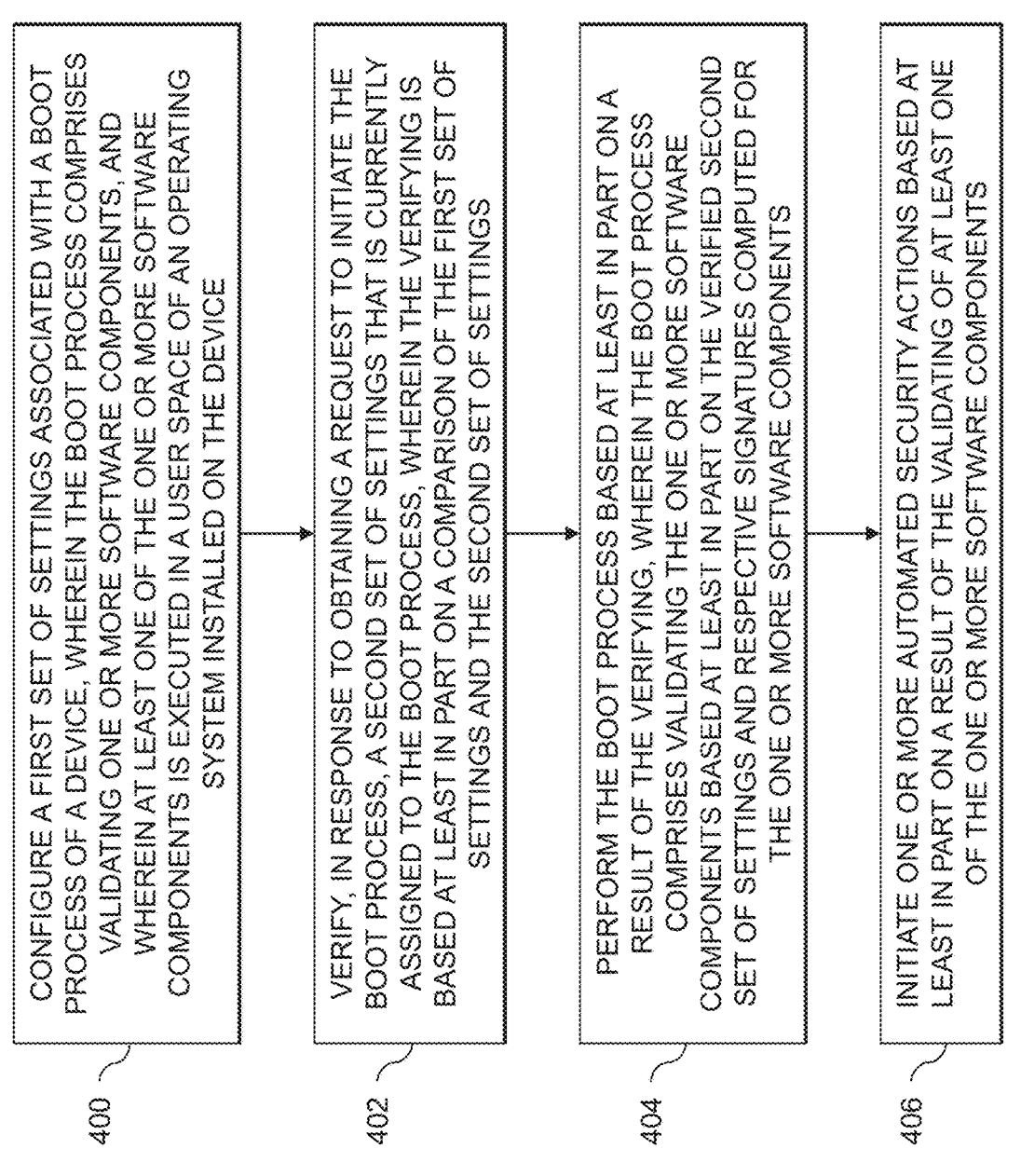

400 — CONFIGURE A FIRST SET OF SETTINGS ASSOCIATED WITH A BOOT PROCESS OF A DEVICE, WHEREIN THE BOOT PROCESS COMPRISES VALIDATING ONE OR MORE SOFTWARE COMPONENTS, AND WHEREIN AT LEAST ONE OF THE ONE OR MORE SOFTWARE COMPONENTS IS EXECUTED IN A USER SPACE OF AN OPERATING SYSTEM INSTALLED ON THE DEVICE

402 — VERIFY, IN RESPONSE TO OBTAINING A REQUEST TO INITIATE THE BOOT PROCESS, A SECOND SET OF SETTINGS THAT IS CURRENTLY ASSIGNED TO THE BOOT PROCESS, WHEREIN THE VERIFYING IS BASED AT LEAST IN PART ON A COMPARISON OF THE FIRST SET OF SETTINGS AND THE SECOND SET OF SETTINGS

404 — PERFORM THE BOOT PROCESS BASED AT LEAST IN PART ON A RESULT OF THE VERIFYING, WHEREIN THE BOOT PROCESS COMPRISES VALIDATING THE ONE OR MORE SOFTWARE COMPONENTS BASED AT LEAST IN PART ON THE VERIFIED SECOND SET OF SETTINGS AND RESPECTIVE SIGNATURES COMPUTED FOR THE ONE OR MORE SOFTWARE COMPONENTS

406 — INITIATE ONE OR MORE AUTOMATED SECURITY ACTIONS BASED AT LEAST IN PART ON A RESULT OF THE VALIDATING OF AT LEAST ONE OF THE ONE OR MORE SOFTWARE COMPONENTS

FIG. 4

SECURE BOOT AND OPERATING SYSTEM MANAGEMENT

BACKGROUND

Devices, such as servers and storage appliances, increasingly have one or more sub-systems (e.g., one or more systems on a chip) that support secure boot functionality. Typically, software code must pass a secure boot verification process before it can be executed on such a sub-system.

SUMMARY

Illustrative embodiments of the disclosure provide techniques for secure boot and operating system management. An exemplary computer-implemented method includes configuring a first set of settings associated with a boot process of a device, where boot process comprises validating one or more software components, and where at least one of the one or more software components is executed in a user space of an operating system installed on the device.

The method includes verifying, in response to obtaining a request to initiate the boot process, a second set of settings that is currently assigned to the boot process, wherein the verifying is based at least in part on a comparison of the first set of settings and the second set of settings. The method also includes performing the boot process based at least in part on a result of the verifying, wherein the boot process comprises validating the one or more software components based at least in part on the verified second set of settings and respective signatures computed for the one or more software components. The process further includes initiating one or more automated security actions based at least in part on a result of the validating of at least one of the one or more software components.

Illustrative embodiments can provide significant advantages relative to conventional techniques. For example, technical problems associated with boot settings (e.g., that are corrupted and/or maliciously altered) are mitigated in one or more embodiments by implementing one or more processes to initialize, validate, recover, and/or update settings for a boot process. At least some embodiments are configured to extend a boot process into a user space of the operating system, thereby providing additional protection against malicious targeting of applications in the user space. Additionally, some embodiments can automatically perform one or more automated security actions when a security issue arises.

These and other illustrative embodiments described herein include, without limitation, methods, apparatus, systems, and computer program products comprising processor-readable storage media.

BRIEF DESCRIPTION OF THE DRAWINGS

FIG. 4 shows a flow diagram of a process for secure boot and operating system management in an illustrative embodiment.

DETAILED DESCRIPTION

Figure 1:
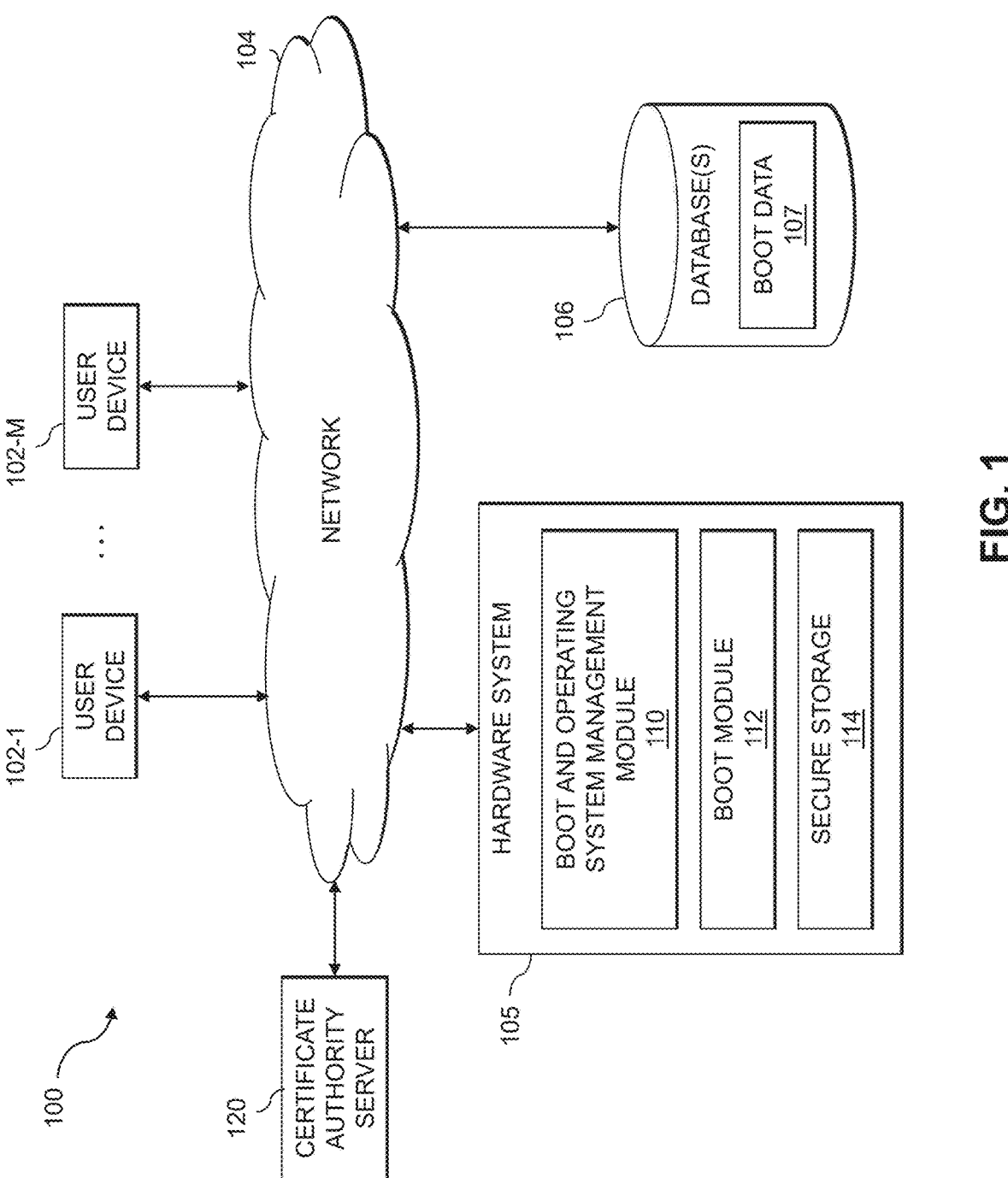
FIG. 1 shows an information processing system configured for secure boot and operating system management in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Devices, such as servers and storage appliances, are often targeted by attackers, for example, using firmware-based methods. Firmware rootkits and bootkits can compromise a system's security, evade detection from operating system tools and/or persist through reinstallation of the operating system.

The secure boot feature of the Unified Extensible Firmware Interface (UEFI) is a standardized approach to mitigate such threats by validating each component in the boot chain against specific certificates containing public keys before allowing such components to load or execute. The components can include, for example, platform firmware, one or more option ROMs, and an operating system boot loader. In some secure boot methods, each component in the boot chain undergoes validation and authorization against a specific certificate before it is allowed to load or execute.

Some operating systems, including various Linux distributions, have extended the boot chain to include the operating system kernel and kernel modules. This creates an end-to-end secure validation (E2ESV) chain.

In a typical E2ESV chain operation, a UEFI BIOS (basic input/output system) verifies a shim signature, which then validates a signature of a boot loader (e.g., GRand Unified Bootloader 2 (Grub2)), the boot loader validates the signature of an operating system kernel, and the operating system kernel validates the signatures of the kernel modules. The UEFI secure boot settings in the UEFI BIOS generally control the entire E2ESV chain. However, kernel module validation functions can also be controlled via kernel parameters specified in a boot loader configuration file.

There are several technological challenges with conventional E2ESV chain techniques. For example, there is no mechanism for automatically enabling the E2ESV chain during initial operating system installation. There is also no mechanism to validate current settings of the E2ESV chain against unexpected settings or to recover settings after they have been hacked or corrupted. Additionally, changes in E2ESV chain settings can go undetected, increasing vulnerability risks. There is no mechanism for updating certificates within the E2ESV chain, which may lead to outdated security measures and compatibility issues with newer firmware or software components. The absence of a user-friendly interface makes managing the E2ESV chain inconvenient and complicated, potentially leading to errors in configuration management.

Existing E2ESV chains only cover the kernel space, neglecting user space applications that can also be targets for firmware rootkit or bootkit attacks. Settings related to the E2ESV chain are often not protected from modification by unauthorized parties with physical access or remote serial system privileges. These limitations can reduce levels of availability, reliability, serviceability and/or security for the E2ESV chain in systems.

Some embodiments described herein provide a secure boot and operating system management architecture that addresses at least some of these challenges.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is at least one hardware system 105 and a certificate authority server 120.

The user devices 102 and/or the at least one hardware system 105 may comprise, for example, host devices, storage appliances, and/or devices such as mobile telephones, laptop computers, tablet computers, desktop computers, or other types of computing devices. Such devices are examples of what are more generally referred to herein as "processing devices." Some of these processing devices are also generally referred to herein as "computers." The user devices 102 and/or the at least one hardware system 105 may comprise a network client that includes networking capabilities such as ethernet, Wi-Fi, etc. When the user devices 102 and/or hardware system 105 are implemented as host devices, the host devices may illustratively comprise servers or other types of computers of an enterprise computer system, cloud-based computer system, or other arrangement of multiple compute nodes associated with respective users.

For example, the host devices in some embodiments illustratively provide compute services such as execution of one or more applications on behalf of each of one or more users associated with respective ones of the host devices.

The user devices 102 and/or the at least one hardware system 105 in some embodiments comprise respective processing devices associated with a particular company, organization, or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model, and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The certificate authority server 120 can be configured to provide a source of trust for the hardware system 105. For example, the certificate authority server 120 can generate one or more key pairs that form a root of trust for the hardware system 105. Additionally, the user devices 102, hardware system 105, and/or the certificate authority server 120 can have an associated database 106 configured to store, for example, boot data 107 related to firmware images and hardware and identity certificates.

At least portions of the database 106 may be implemented, for example, using a vault provided by an operating system of the hardware system 105 and/or one or more of the user devices 102.

The database 106 in the present embodiment is implemented using one or more storage systems associated with the hardware system 105. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more user devices 102 and/or the hardware system 105 may be implemented on a common processing platform, or on separate processing platforms. The user devices 102 and/or hardware system 105 may be configured to interact over the network 104 in at least some embodiments with the certificate authority server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The hardware system 105 further comprises a boot and operating system management module 110, a boot module 112, and secure storage 114.

The boot and operating system management module 110 is generally configured to initialize, validate, recover, and/or update settings for a boot process performed by the boot module 112. The term "boot process" in this context and elsewhere herein is intended to be broadly construed so as to encompass, for example, secure boot processes, boot chain processes, and other types of processes associated with boot functionality.

In some embodiments, the boot module 112 can comprise code (e.g., a trusted boot ROM) for performing the boot process. During the boot process, the boot module 112 verifies one or more components (e.g., instructions or software) based on respective signatures of the components.

In response to detecting certain types of issues, the boot and operating system management module 110 may be configured to lock the secure storage 114 to protect user data stored therein (e.g., data associated with at least one of the user devices 102 and/or the hardware system 105). In some embodiments, the secure storage 114 can include one or more self-encrypting drives (SEDs). The boot and operating system management module 110 is optionally configured to generate one or more alerts for alerting one or more users of issues with the boot process.

In at least one embodiment, the hardware system 105 can comprise a local certificate store (e.g., stored on the secure storage 114 or some other secure memory associated with the hardware system 105) for storing private keys, certificates, and/or symmetric keys (e.g., created by the certificate authority server 120). For example, the local certificate store can be implemented as a file, a cryptographic token, a digital vault, or using an operating system mechanism of the hardware system 105. As an example, the certificate authority server 120 can generate certificates for trusted components, which are signed using one or more private keys. The boot module 112 can then validate a given component before allowing it to load and/or execute, for example.

As a non-limiting example, the hardware system 105 can include a trusted platform module (not shown in FIG. 1) comprising one or more registers (e.g., platform configuration registers), a secure storage, and a cryptographic processor that supports various cryptographic capabilities. The trusted platform module may employ such cryptographic capabilities to calculate one or more hash values based on software and/or firmware instructions utilized by certain components of the hardware system 105, such as a BIOS and/or a boot loader. Such hash values may be compared to reference hash values previously stored in a secure memory (e.g., generated by the certificate authority server 120), for example, during a factory provisioning of the hardware system 105. In this manner, the trusted platform module may establish a root of trust to validate that other components of the hardware system 105 are using instructions that originate from a trusted source.

Depending on the implementation, the at least one hardware system 105 can further include one or more secure sub-systems (not shown in FIG. 1). For example, the secure sub-systems can comprise a security processor or system on a chip, such as a baseboard management controller (BMC) or another out-of-band (OOB) controller. In further variations, one or more of the one or more security sub-systems may be implemented, for example, as a microprocessor, a microcontroller, an application-specific integrated circuit (ASIC), a field-programmable gate array (FPGA), a host processor module, a storage controller, or other type of silicon-based processing circuitry, as well as portions or combinations of such circuitry elements.

Also associated with the hardware system 105 and/or the user devices 102 are one or more input-output devices, which illustratively comprise keyboards, displays, or other types of input-output devices in any combination. Such input-output devices can be used, for example, to support one or more user interfaces to the hardware system 105 and/or the user devices 102, as well as to support communication between hardware system 105 and other related systems and devices not explicitly shown.

Additionally, the hardware system 105 in the FIG. 1 embodiment is assumed to be implemented using at least one processing device. Each such processing device generally comprises at least one processor and an associated memory, and implements one or more functional modules for controlling certain features of the hardware system 105. More particularly, the hardware system 105 in this embodiment can comprise a processor coupled to a memory and a network interface. The processor illustratively comprises a microprocessor, a microcontroller, an ASIC, an FPGA, or other type of processing circuitry, as well as portions or combinations of such circuitry elements. The memory illustratively comprises random access memory (RAM), read-only memory (ROM), or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the hardware system 105 to communicate over the network 104 with the user devices 102, and illustratively comprises one or more conventional transceivers.

It is to be appreciated that this particular arrangement of elements 110, 112, and 114 illustrated in the hardware system 105 of the FIG. 1 embodiment is presented by way of example only, and alternative arrangements can be used in other embodiments. For example, the functionality associated with elements 110, 112, and 114 in other embodiments can be combined into a single element, or separated across a larger number of elements. As another example, multiple distinct processors can be used to implement different ones of elements 110, 112, 114, or portions thereof.

At least portions of elements 110, 112, and 114 may be implemented at least in part in the form of software that is stored in memory and executed by a processor. An exemplary process utilizing elements 110, 112, and 114 of the hardware system 105 in computer network 100 will be described in more detail with reference to FIGS. 2 to 4, for example.

It is to be understood that the particular set of elements shown in FIG. 1 for secure boot and operating system management is presented by way of illustrative example only, and in other embodiments additional or alternative elements may be used. Thus, another embodiment includes additional or alternative systems, devices, and other network entities, as well as different arrangements of modules and other components.

Figure 2:
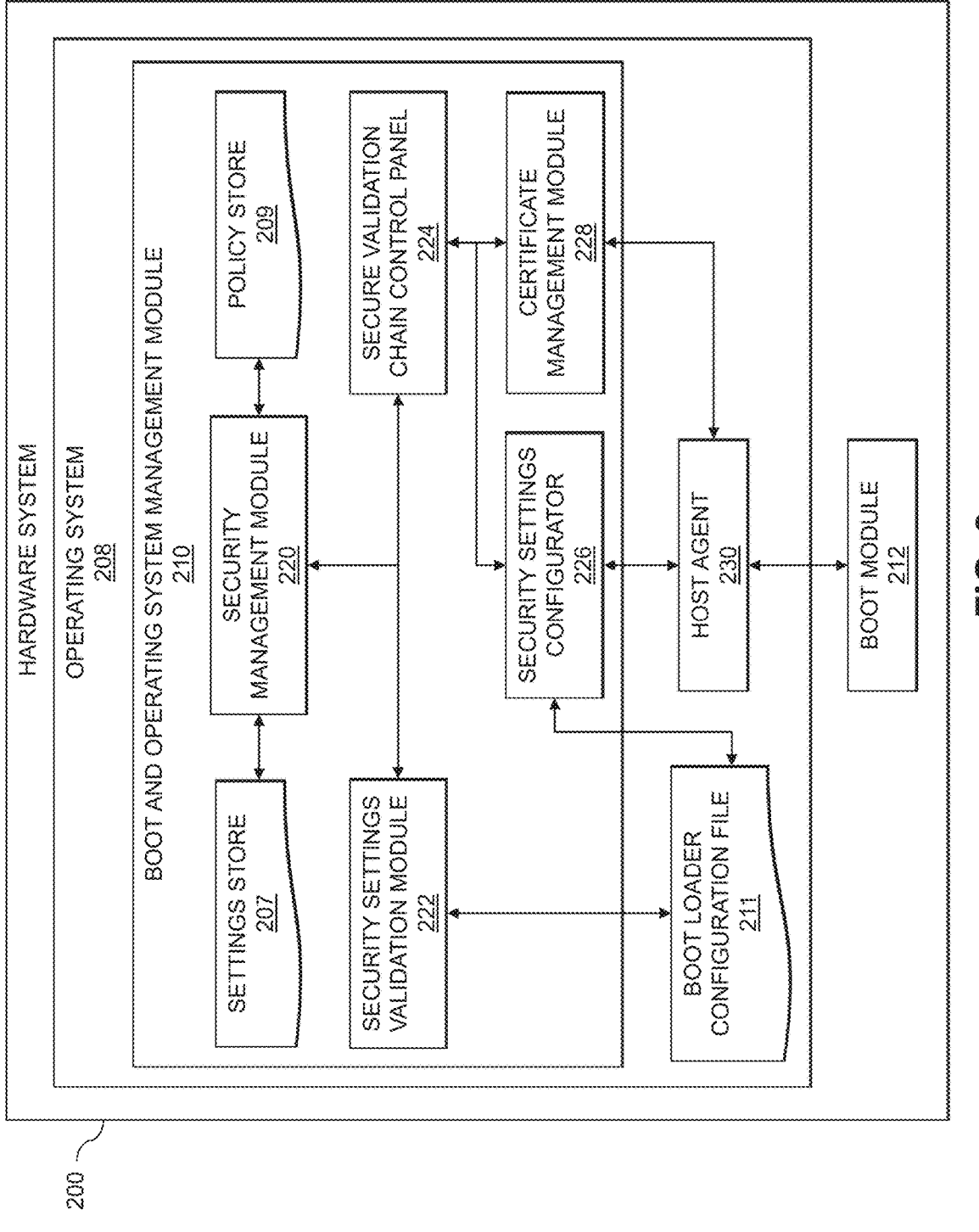
FIG. 2 shows a secure boot and operating system management architecture in an illustrative embodiment.

FIG. 2 illustrates a secure boot and operating system management architecture in an illustrative embodiment. In this embodiment, a hardware system 200 (e.g., corresponding to the hardware system 105) includes an operating system 208 and a boot module 212. When the hardware system 200 is powered on, the boot module 212 can initiate a boot process. For example, the hardware system 200, or portions thereof, can implement a boot process to ensure only verified software is loaded by the hardware system 200.

In the FIG. 2 embodiment, the operating system 208 comprises a boot and operating system management module 210, which includes a security management module 220, a security setting validation module 222, a secure validation chain control panel 224, a security setting configurator 226, and a certificate management module 228.

The boot and operating system management module 210 can perform various operations for configuring the boot module 212 to perform a boot process. In some embodiments, the boot and operating system management module 210 can configure the boot module 212, via a host agent 230. For example, the security management module 220 obtains one or more settings from a settings store 207 and at least one security policy from a policy store 209. The settings store 207 can include security-related settings and one or more certificates, and the policy store 209 can include information for comparing one or more settings in the settings store 207 to a current configuration of the hardware system 200, for example, according to one or more policies of the policy store 209. Optionally, a given policy in the policy store 209 can specify one or more rules for triggering alerts and/or emails. Non-limiting examples of a rule can include, triggering an email (or an alert) in response to a current value of a designated setting being different than the value stored in the settings store 207.

In at least one embodiment, the security management module 220 can perform an initialization process when the operating system 208 is being installed. For example, an installer of the operating system 208 can request that the security management module 220 perform the initialization process. In response to the request, the security management module 220 can retrieve at least a subset of the settings from the settings store 207 (e.g., a set of default settings). The security management module 220 then sends a request to the secure validation chain control panel 224 to apply the retrieved settings.

In some embodiments, the secure validation chain control panel 224 utilizes the certificate management module 228 to initialize one or more certificates and configures retrieved settings using the security settings validation module 222. The settings may include one or more of the following: a secure boot setting, which can be set to enabled or disabled; a secure boot policy setting, which can be set to standard or custom; and a secure boot mode setting, which can be set to a deploy mode or a user mode. Generally, if the secure boot policy is set to standard then a default set of keys are applied, whereas custom mode allows a user to add and/or remove keys. In the user mode and the deploy mode, the boot process verifies the boot loader and operating system kernel. The deploy mode also blocks any programmatic methods that could alter the secure boot mode without physically accessing the UEFI settings. The default values for these settings, in some embodiments, are enabled, standard, and deploy mode, respectively.

The boot module 212, in some embodiments, can comprise a boot loader (e.g., a Grub2 boot loader), which can have a setting to indicate whether or not to enforce kernel module signature validation. The default value for this setting, in some embodiments, is set by the security settings validation module 222 to enforce the kernel module signature validation. As a non-limiting example, the security settings validation module 222 can update a boot loader configuration file 211 with the appropriate settings.

A boot chain protection process can be performed in response to a boot process being initiated for the first time after the operating system 208 is installed. According to some embodiments, the boot chain protection process can include the security settings configurator 226 obtaining user input for one or more settings to set one or more passwords and/or to modify the values assigned to one or more of the secure boot settings, the secure boot policy setting, and/or the secure boot mode setting. The one or more passwords can comprise a Grub2 password and/or a BIOS password.

The BIOS password protects against an unauthorized modification of BIOS settings, and the Grub2 password protects against an unauthorized modification of Grub2 settings (e.g., a setting for selecting a default operating system, a timeout setting that specifies a length of time the Grub2 menu will appear before booting the operating system, etc.).

In some embodiments, the boot chain protection process includes the security management module 220 sending a request, comprising the one or more passwords set by the user, to the secure validation chain control panel 224. The secure validation chain control panel 224 calls the security settings configurator 226 to apply the passwords and any other settings specified by the user. For example, the security settings configurator 226 can update the boot loader configuration file 211 with the Grub2 password and provide the host agent 230 with the BIOS password.

Some embodiments include the boot and operating system management module 210 performing a validation and recovery process each time the operating system 208 is booted. This process validates settings and recovers such settings if they fail validation. For instance, the security management module 220 obtains a set of default values for one or more settings and a list of certificates from the settings store 207. The security settings validation module 222 then compares these retrieved values with the current values, which can be obtained from the boot loader configuration file and the host agent 230. For example, at least some of the current values can be obtained from the host agent 230 via a representational state transfer (REST) application programming interface (API).

In response to detecting a mismatch in one or more of the settings, the security settings validation module 222 can notify the secure validation chain control panel 224 to recover the values for such settings. The secure validation chain control panel 224 sends a request to the certificate management module 228 to recover one or more certificates and/or to the security settings configurator 226 to recover the settings. The recovered settings and/or certificates can be applied by the host agent 230 via a REST API, for example.

Some embodiments also include the boot and operating system management module 210 monitoring settings during the runtime of the operating system 208. In one such embodiment, a daemon service is initiated during startup that continuously monitors security-related settings. The daemon service sends a request to the security management module 220 to verify the current system configuration based on default settings and a list of certificates from the settings store 207. The security management module 220 re-validates the settings and certificates periodically and/or in response to a trigger (e.g., a user request) in some embodiments.

Upon detecting a mismatch, the security management module 220 generates an alert to notify the user about the discrepancy and initiates a recovery through the secure validation chain control panel 224. This recovery process is similar to the one in the validation and recovery process, for example.

In some embodiments, the boot and operating system management module 210 performs a certificate management process in response to the operating system 208 being updated. The security management module 220 obtains a list of certificates from the settings store 207 and calls the secure validation chain control panel 224 to update the certificates. The secure validation chain control panel 224 then calls the certificate management module 228 to update the certificates, which can be accomplished by removing expired certificates and installing new certificates via REST API calls.

Alternatively, or additionally, the boot and operating system management module 210 can also enable chain management techniques, for example, via a user interface associated with the hardware system 200. The security management module 220 can receive a request to update settings and/or perform a certificate management operation through the user interface. In response, the security management module 220 calls the secure validation chain control panel 224 to update the boot loader configuration file and/or the host agent 230 with the new settings. If the request involves a certificate management operation, then the security management module 220 calls the certificate management module 228 to perform the operation. The certificate management module 228 can uninstall expired certificates and/or install new certificates, and notify the host agent 230 of the certificate changes.

In at least one embodiment, the boot and operating system management module 210 extends the boot chain into a user space of the operating system.

Figure 3:
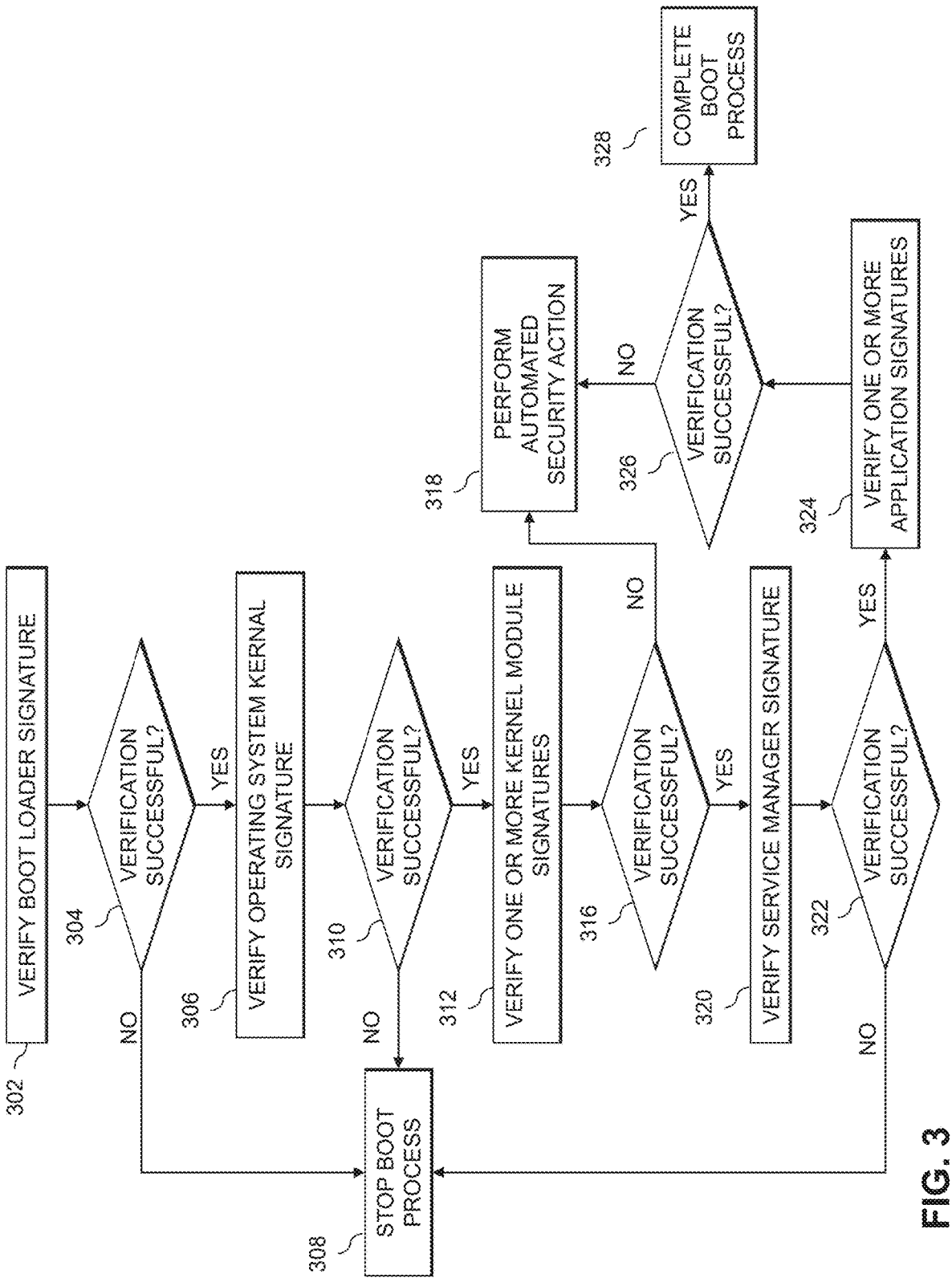
FIG. 3 shows a flow diagram of a verification chain process in an illustrative embodiment.

FIG. 3 illustrates an example of a boot chain validation process in accordance with an illustrative embodiment. It is to be understood that this particular process is only an example, and additional or alternative processes can be carried out in other embodiments. In this embodiment, the process includes steps 302 through 328, which are assumed to be performed by the hardware system 200 using its elements 208 and 212.

Step 302 includes verifying a boot loader signature. For example, step 302 can be performed in response to a secure boot process being initiated by the boot module 212. In some embodiments, the boot loader signature can be computed based on the software and/or firmware instructions utilized by a boot loader associated with the boot module 212. This computed signature is then compared to a trusted signature (e.g., from the settings store 207).

Step 304 checks whether the verification in step 302 is successful. If not, the boot process stops in step 308. If the verification is successful, the process continues to step 306, which includes verifying an operating system kernel signature. For example, step 306 can be performed after the boot loader has been loaded. The operating system kernel signature can be validated using a similar process as step 302 by computing the operating system kernel signature and comparing it to a trusted operating system kernel signature.

Step 310 checks whether the verification in step 306 is successful. If not, the boot process stops in step 308. If the verification is successful, the process continues to step 312, which verifies one or more operating system kernel module signatures. Step 312, in some embodiments, can be performed following the operating system kernel being loaded, and the verification of the operating system kernel module signatures can be performed using a similar process as steps 302 and 306.

Step 316 checks whether the verification in step 312 is successful. More specifically, step 316 can include checking whether each of the one or more operating system kernel module signatures has been successfully verified. If not, the process continues to step 318, which includes performing one or more automated security actions. The one or more automated security actions can include, for example, locking at least a portion of one or more storage devices comprising user data, generating one or more alerts or emails warning the user of potential issues, and/or preventing a given operating system kernel module from loading when its signature fails verification. If step 316 is successful, the process continues to step 320, which includes verifying a service manager signature (e.g., init or systemd) using a similar process as steps 302, 306, and 312.

Step 322 checks whether the verification in step 320 is successful. If not, the boot process stops in step 308. If the verification is successful, the process continues to step 324, which includes verifying one or more application signatures. The one or more application signatures can correspond to applications in a user space of the operating system, thereby extending the boot chain into the user space.

Step 326 checks whether the verification in step 324 is successful. More specifically, step 326 includes checking whether each of the one or more application signatures has been successfully verified. If not, the process continues to step 318, which includes performing one or more automated security actions. As noted above, the automated security actions can include, for example, locking a storage device, generating one or more alerts or emails, and/or preventing a given application from loading when its corresponding application signature fails verification. If step 326 is successful, then the boot process is completed in step 328.

FIG. 4 is a flow diagram of a process for secure boot and operating system management in an illustrative embodiment. It is to be understood that this particular process is only an example, and additional or alternative process can be carried out in other embodiments.

In this embodiment, the process includes steps 400 through 406. These steps are assumed to be performed by the hardware system 105 utilizing its elements 110, 112, and 114.

Step 400 includes configuring a first set of settings associated with a boot process of a device, wherein the boot process comprises validating one or more software components, and wherein at least one of the one or more software components is executed in a user space of an operating system installed on the device.

Step 402 includes verifying, in response to obtaining a request to initiate the boot process, a second set of settings that is currently assigned to the boot process, wherein the verifying is based at least in part on a comparison of the first set of settings and the second set of settings.

Step 404 includes performing the boot process based at least in part on a result of the verifying, wherein the boot process comprises validating the one or more software components based at least in part on the verified second set of settings and respective signatures computed for the one or more software components.

Step 406 includes initiating one or more automated security actions based at least in part on a result of the validating of at least one of the one or more software components.

The verifying may include determining whether at least one setting in the first set of settings differs from a corresponding at least one setting in the second set of settings, and initiating, based at least in part on a result of the determining, a recovery process to update the second set of settings based on the first set of settings.

The process can further include a step of configuring a service to detect changes to the second set of settings during a runtime of the operating system.

The boot process may compare the signature computed for a given one of the one or more software components to a digital certificate signed by a designated authority (e.g., a certificate authority).

The process may further include a step of removing the digital certificate corresponding to the given one of the one or more software components in response to detecting that the digital certificate is expired, and automatically installing a new digital certificate for the given one of the one or more software components.

The one or more automated security actions may include stopping the boot process, locking at least a portion of one or more storage devices comprising user data, and/or generating an alert comprising information associated with the at least one software component that was not validated.

The first set of settings may include at least one password for protecting against an unauthorized modification of a boot loader component and/or a basic input/output system component of the device.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches for managing boot and operating system security settings. For example, some embodiments automatically configure a boot process during installation of an operating system to ensure only verified software is loaded. Additionally, at least some embodiments are configured to provide a validation mechanism that can validate the current settings (e.g., related to a boot chain) of a boot process against expected settings, as well as an automatic recovery mechanism that can recover the settings when the settings have been compromised (e.g., corrupted and/or hacked). Furthermore, some embodiments are also configured to include updating mechanisms for certificates and user space applications within the boot chain, as well as a monitor daemon for handling validation failures, monitoring settings and certificates, and possibly generating alerts and emails to warn users of potential boot issues. Some embodiments are also configured to provide locking mechanisms for drives holding user data in the event of a potential tampering with kernel modules or user space applications, as well as generating alerts and/or emails when such security issues arise. These and other embodiments can effectively overcome problems associated with conventional techniques that often require complicated manual configurations and updates, additional components for validation and recovery, and/or lack sufficient monitoring capabilities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
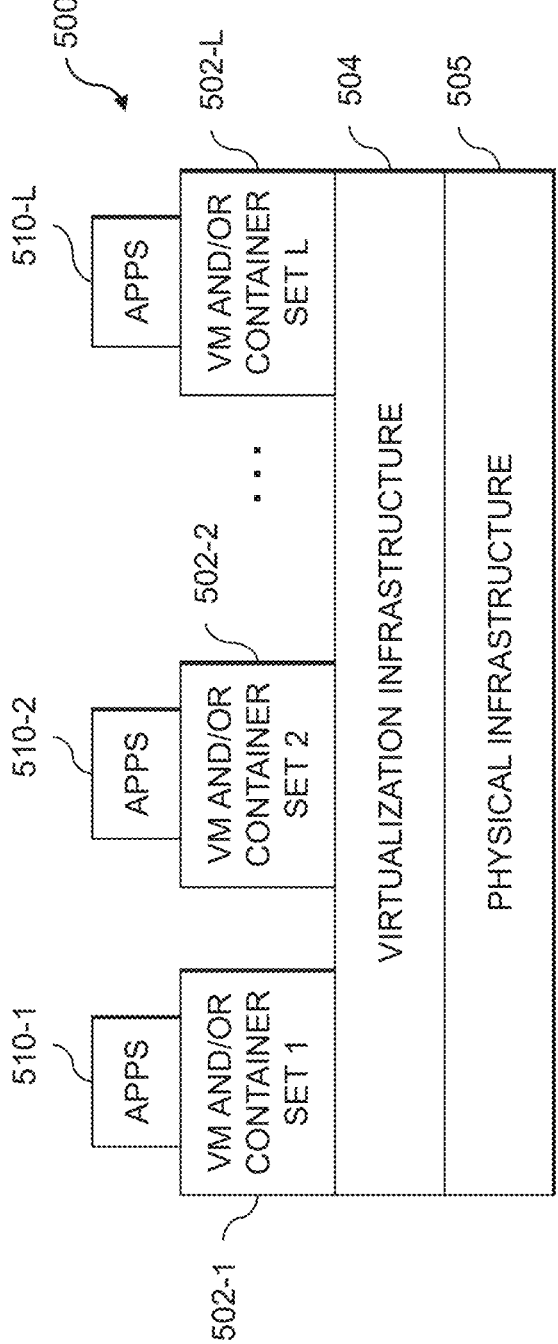
FIGS. 5 and 6 show examples of processing platforms that may be utilized to implement at least a portion of an information processing system in illustrative embodiments.
Figure 6:
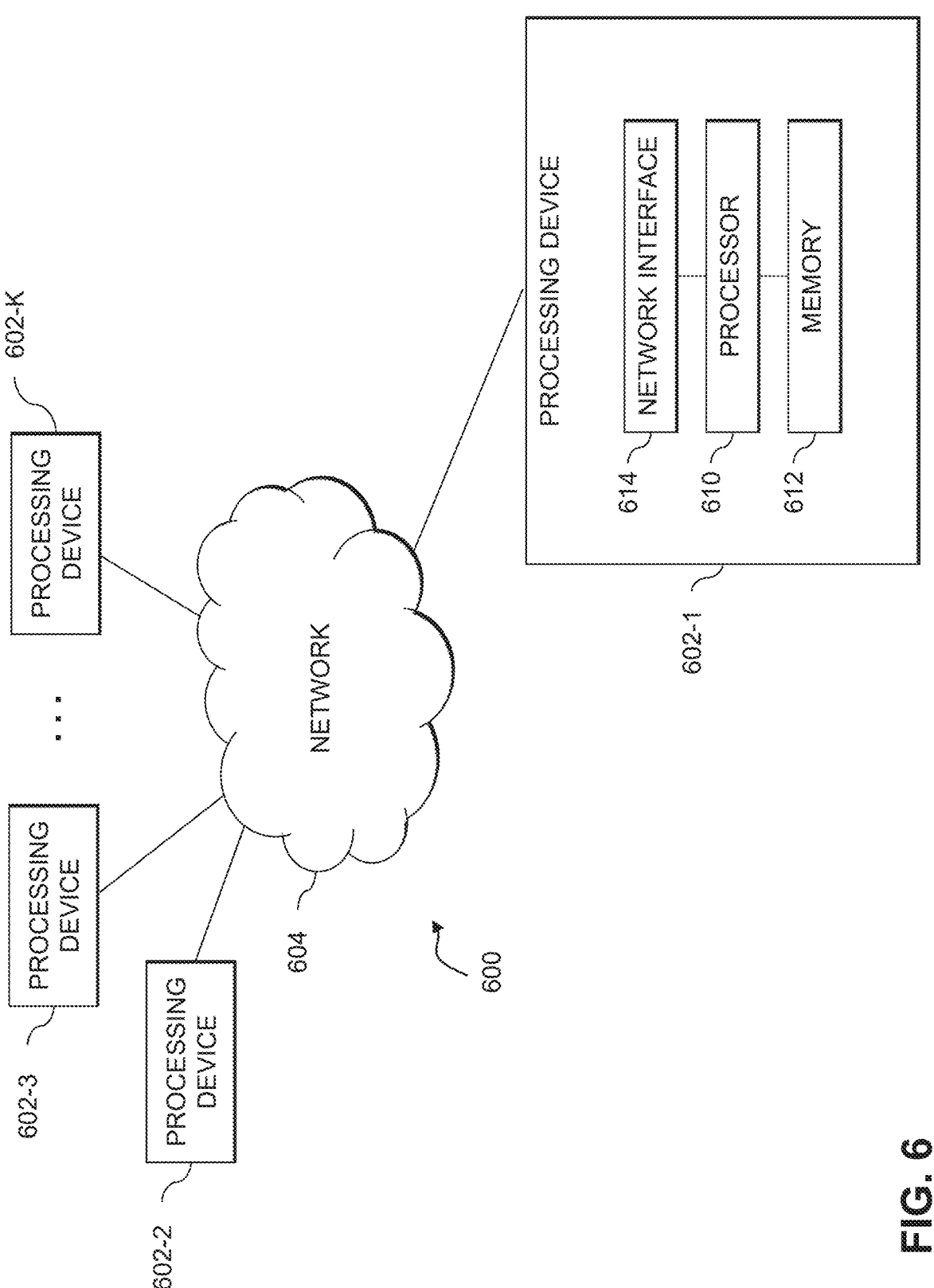

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, an FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

configuring a first set of settings associated with a boot process of a device, wherein the boot process comprises validating one or more software components, and wherein at least one of the one or more software components is executed in a user space of an operating system installed on the device;

verifying, in response to obtaining a request to initiate the boot process, a second set of settings that is currently assigned to the boot process, wherein the verifying is based at least in part on a comparison of the first set of settings and the second set of settings;

performing the boot process based at least in part on a result of the verifying, wherein the boot process comprises validating the one or more software components based at least in part on the verified second set of settings and respective signatures computed for the one or more software components; and initiating one or more automated security actions based at least in part on a result of the validating of at least one of the one or more software components;

wherein the method is performed by at least one processing device comprising a processor coupled to a memory.

2. The computer-implemented method of claim 1, wherein the verifying comprises:

determining whether at least one setting in the first set of settings differs from a corresponding at least one setting in the second set of settings; and initiating, based at least in part on a result of the determining, a recovery process to update the second set of settings based on the first set of settings.

3. The computer-implemented method of claim 1, further comprising:

configuring a service to detect changes to the second set of settings during a runtime of the operating system.

4. The computer-implemented method of claim 1, wherein the boot process compares the signature computed for a given one of the one or more software components to a digital certificate signed by a designated authority.

5. The computer-implemented method of claim 4, further comprising:

removing the digital certificate corresponding to the given one of the one or more software components in response to detecting that the digital certificate is expired; and automatically installing a new digital certificate for the given one of the one or more software components.

6. The computer-implemented method of claim 1, wherein the one or more automated security actions comprise at least one of:

stopping the boot process;

locking at least a portion of one or more storage devices comprising user data; and generating an alert comprising information associated with the at least one software component that was not validated.

7. The computer-implemented method of claim 1, wherein the first set of settings comprises at least one password for protecting against an unauthorized modification of at least one of: a boot loader component and a basic input/output system component of the device.

8. A non-transitory processor-readable storage medium having stored therein program code of one or more software programs, wherein the program code when executed by at least one processing device causes the at least one processing device:

to configure a first set of settings associated with a boot process of a device, wherein the boot process comprises validating one or more software components, and wherein at least one of the one or more software components is executed in a user space of an operating system installed on the device;

to verify, in response to obtaining a request to initiate the boot process, a second set of settings that is currently assigned to the boot process, wherein the verifying is based at least in part on a comparison of the first set of settings and the second set of settings;

to perform the boot process based at least in part on a result of the verifying, wherein the boot process comprises validating the one or more software components based at least in part on the verified second set of settings and respective signatures computed for the one or more software components; and to initiate one or more automated security actions based at least in part on a result of the validating of at least one of the one or more software components.

9. The non-transitory processor-readable storage medium of claim 8, wherein the verifying comprises:

determining whether at least one setting in the first set of settings differs from a corresponding at least one setting in the second set of settings; and initiating, based at least in part on a result of the determining, a recovery process to update the second set of settings based on the first set of settings.

10. The non-transitory processor-readable storage medium of claim 8, wherein the program code when executed by the at least one processing device further causes the at least one processing device:

to configure a service to detect changes to the second set of settings during a runtime of the operating system.

11. The non-transitory processor-readable storage medium of claim 8, wherein the boot process compares the signature computed for a given one of the one or more software components to a digital certificate signed by a designated authority.

12. The non-transitory processor-readable storage medium of claim 11, wherein the program code when executed by the at least one processing device further causes the at least one processing device:

to remove the digital certificate corresponding to the given one of the one or more software components in response to detecting that the digital certificate is expired; and to automatically install a new digital certificate for the given one of the one or more software components.

13. The non-transitory processor-readable storage medium of claim 8, wherein the one or more automated security actions comprise at least one of:

stopping the boot process;

locking at least a portion of one or more storage devices comprising user data; and generating an alert comprising information associated with the at least one software component that was not validated.

14. The non-transitory processor-readable storage medium of claim 8, wherein the first set of settings comprises at least one password for protecting against an unauthorized modification of at least one of: a boot loader component and a basic input/output system component of the device.

15. An apparatus comprising:

at least one processing device comprising a processor coupled to a memory;

the at least one processing device being configured:

to configure a first set of settings associated with a boot process of a device, wherein the boot process comprises validating one or more software components, and wherein at least one of the one or more software components is executed in a user space of an operating system installed on the device;

to verify, in response to obtaining a request to initiate the boot process, a second set of settings that is currently assigned to the boot process, wherein the verifying is based at least in part on a comparison of the first set of settings and the second set of settings;

to perform the boot process based at least in part on a result of the verifying, wherein the boot process comprises validating the one or more software components based at least in part on the verified second set of settings and respective signatures computed for the one or more software components; and to initiate one or more automated security actions based at least in part on a result of the validating of at least one of the one or more software components.

16. The apparatus of claim 15, wherein the verifying comprises:

determining whether at least one setting in the first set of settings differs from a corresponding at least one setting in the second set of settings; and initiating, based at least in part on a result of the determining, a recovery process to update the second set of settings based on the first set of settings.

17. The apparatus of claim 15, wherein the at least one processing device is further configured:

to configure a service to detect changes to the second set of settings during a runtime of the operating system.

18. The apparatus of claim 15, wherein the boot process compares the signature computed for a given one of the one or more software components to a digital certificate signed by a designated authority.

19. The apparatus of claim 18, wherein the at least one processing device is further configured:

to remove the digital certificate corresponding to the given one of the one or more software components in response to detecting that the digital certificate is expired; and to automatically install a new digital certificate for the given one of the one or more software components.

20. The apparatus of claim 15, wherein the one or more automated security actions comprise at least one of:

stopping the boot process;

locking at least a portion of one or more storage devices comprising user data; and generating an alert comprising information associated with the at least one software component that was not validated.

*    *    *    *    *